US012599894B2

(12) United States Patent
Sung et al.

(10) Patent No.: US 12,599,894 B2
(45) Date of Patent: Apr. 14, 2026

(54) CATALYTIC ARTICLE AND METHOD OF MANUFACTURING THE CATALYTIC ARTICLE

(71) Applicant: BASF MOBILE EMISSIONS CATALYSTS LLC, Iselin, NJ (US)

(72) Inventors: Shiang Sung, Iselin, NJ (US); Xiaolai Zheng, Iselin, NJ (US); Aleksei Vjunov, Iselin, NJ (US); Chunxin Ji, Iselin, NJ (US); Karifala Dumbuya, Hannover (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 985 days.

(21) Appl. No.: 17/595,321

(22) PCT Filed: Jun. 23, 2020

(86) PCT No.: PCT/US2020/039103
§ 371 (c)(1),
(2) Date: Nov. 15, 2021

(87) PCT Pub. No.: WO2020/263806
PCT Pub. Date: Dec. 30, 2020

(65) Prior Publication Data
US 2022/0212170 A1 Jul. 7, 2022

Related U.S. Application Data

(60) Provisional application No. 62/867,351, filed on Jun. 27, 2019.

(30) Foreign Application Priority Data

Jul. 12, 2019 (EP) .................................... 19185912

(51) Int. Cl.
*B01J 23/46* (2006.01)
*B01D 53/94* (2006.01)
(Continued)

(52) U.S. Cl.
CPC .......... *B01J 23/464* (2013.01); *B01D 53/945* (2013.01); *B01J 23/10* (2013.01); *B01J 35/19* (2024.01);
(Continued)

(58) Field of Classification Search
None
See application file for complete search history.

(56) References Cited

U.S. PATENT DOCUMENTS 4,153,579 A 5/1979 Summers et al.

FOREIGN PATENT DOCUMENTS

EP 0 203 515 A1 12/1986
WO WO 2009/012348 A1 1/2009
(Continued)

OTHER PUBLICATIONS

International Seach Report dated Sep. 9, 2020, PCT/US2020/039103.

*Primary Examiner* — Daniel Berns
(74) *Attorney, Agent, or Firm* — DLA Piper LLP (US)

(57) ABSTRACT

The presently claimed invention provides a catalytic article and an exhaust gas treatment system. The catalytic article comprises platinum supported on a first support comprising ceria containing metal oxide component; rhodium supported on a second support selected from a refractory alumina component, an oxygen storage component or a combination thereof; and a substrate, wherein said catalytic article is essentially free of palladium. The presently claimed invention also provides a process for preparing the catalytic article and use of the catalytic article and the exhaust gas treatment system for purifying a gaseous exhaust stream comprising hydrocarbons, carbon monoxide, and nitrogen oxide.

23 Claims, 7 Drawing Sheets

| Pt/Rh on OSC and Alumina, Sr/Ba |
|---|
| Substrate |

| Pt/Rh on OSC and Alumina |
|---|
| Substrate |

(51) Int. Cl.

| | |
|---|---|
| *B01J 21/04* | (2006.01) |
| *B01J 23/10* | (2006.01) |
| *B01J 23/42* | (2006.01) |
| *B01J 35/00* | (2006.01) |
| *B01J 35/56* | (2024.01) |
| *B01J 35/57* | (2024.01) |
| *B01J 37/02* | (2006.01) |
| *B01J 37/03* | (2006.01) |
| *B01J 37/04* | (2006.01) |
| *B01J 37/08* | (2006.01) |
| *F01N 3/10* | (2006.01) |
| *F01N 3/28* | (2006.01) |

(52) U.S. Cl.
CPC ............. *B01J 35/56* (2024.01); *B01J 37/038* (2013.01); *B01J 37/04* (2013.01); *B01J 37/082* (2013.01); *F01N 3/101* (2013.01); *F01N 3/2828* (2013.01); *F01N 3/2842* (2013.01); *B01D 2255/1021* (2013.01); *B01D 2255/1025* (2013.01); *B01D 2255/2065* (2013.01); *B01D 2255/2092* (2013.01); *B01D 2255/407* (2013.01); *B01D 2255/9022* (2013.01); *B01D 2255/908* (2013.01); *B01J 35/57* (2024.01); *F01N 2330/02* (2013.01); *F01N 2330/06* (2013.01); *F01N 2370/02* (2013.01)

(56) References Cited

FOREIGN PATENT DOCUMENTS

| | | |
|---|---|---|
| WO | WO 2010/001215 A2 | 1/2010 |
| WO | WO 2013/021395 A1 | 2/2013 |

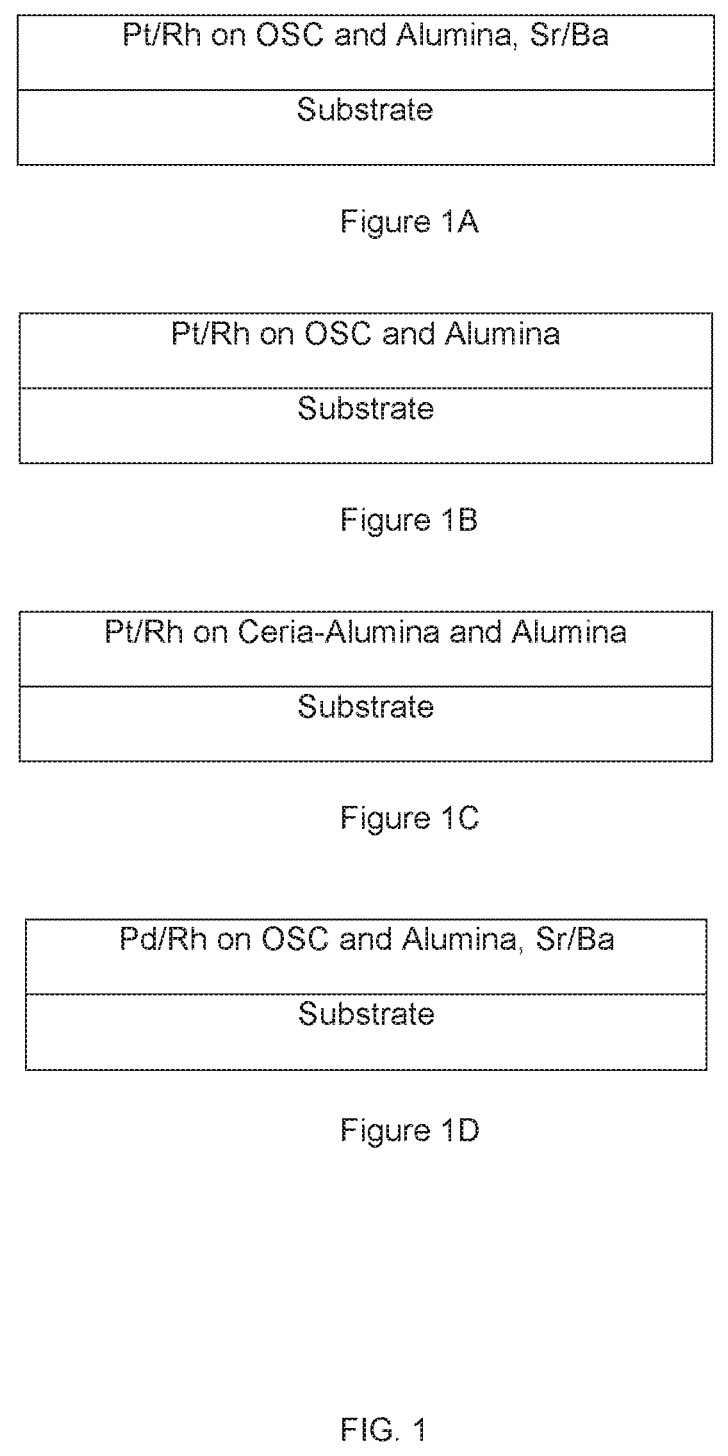

| Pt/Rh on OSC and Alumina, Sr/Ba |
| --- |
| Substrate |

Figure 1A

| Pt/Rh on OSC and Alumina |
| --- |
| Substrate |

Figure 1B

| Pt/Rh on Ceria-Alumina and Alumina |
| --- |
| Substrate |

Figure 1C

| Pd/Rh on OSC and Alumina, Sr/Ba |
| --- |
| Substrate |

CATALYTIC ARTICLE AND METHOD OF MANUFACTURING THE CATALYTIC ARTICLE

CROSS-REFERENCE TO RELATED APPLICATIONS

This application is a national stage filing under 35 U.S.C. § 371 of International Application No. PCT/US2020/039103 filed on Jun. 23, 2020, which claims priority to US Provisional Application No. 62/867,351, filed on Jun. 27, 2019, and to European Application No. 19185912.3, filed on Jul. 12, 2019; the content of each application is incorporated herein by reference in its entirety.

FIELD OF THE INVENTION

The presently claimed invention relates to a catalytic article useful for the treatment of the exhaust gases to reduce contaminants contained therein. Particularly, the presently claimed invention relates to a platinum-based catalytic article, a method of preparing the catalytic article and its use as an emission control catalyst.

BACKGROUND OF THE INVENTION

Three-way conversion (TWC) catalysts (hereinafter interchangeably referred to as three-way conversion catalyst, three-way catalyst, TWC Catalyst, and TWC) have been utilized in the treatment of the exhaust gas streams from the internal combustion engines for several years. Generally, in order to treat or purify the exhaust gas containing pollutants such as hydrocarbons, nitrogen oxides, and carbon monoxide, catalytic converters containing a three-way conversion catalyst are used in the exhaust gas line of an internal combustion engine. The three-way conversion catalyst is typically known to oxidize unburnt hydrocarbon and carbon monoxide and reduce nitrogen oxides.

Typically, in the exhaust gas treatment system for gasoline vehicle applications, a two-catalyst-monolith system is used. The front brick, close-coupled catalyst (CC1), has a higher PGM loading mainly to handle cold-start and high-speed driving emissions. The second brick, a clean-up catalyst (CC2), has a lower PGM loading to handle additional emissions caused by driving duties such as acceleration, uphill, etc. Currently, the emission treatment system is being exclusively served by the Pd/Rh technology in which palladium is used as a major platinum group metal component along with a lesser amount of rhodium.

It is possible that a palladium supply shortage may arise in the market in upcoming years since a large amount of palladium is used for the fabrication of catalytic converters that help to reduce the exhaust gas pollutant amounts. Currently, palladium is substantially expensive than platinum. At the same time, the platinum prices are expected to decrease due to decreasing demand of platinum. One of the reasons could be the decreasing production volumes of diesel-powered vehicles.

Accordingly, there is a need to replace a portion of palladium with platinum in the TWC catalyst in order to reduce the cost of the catalyst substantially. Platinum has been widely used in a diesel oxidation catalyst (DOC) and lean NOx traps (LNT) for emission control of diesel-fueled vehicles but its use in gasoline-fueled vehicles is limited. The proposed approach of replacing the portion of palladium with platinum is complicated by the need to maintain or improve the desired efficacy of the catalyst, which may not be possible by simply replacing a portion of palladium with platinum. Prior art also mentions that palladium is found to outperform platinum, and this difference appears to be higher in more stressful conditions such as high-speed driving or wide perturbation amplitude. One of the reasons is that platinum is less stable compared to palladium and different supports offer different bonding energies towards Pd or Pt. Platinum is prone to sintering under high temperature aging conditions with an extended duration. In addition, warranty of the vehicles has become longer e.g. from 100,000 miles/10 years to 150,000 miles/15 years and thus, OEMs are obligated to use a more severe aging protocol (i.e. increasing the aging temperature from 850° C. peak temperature to 950, 1000 and 1050° C., depending on OEMs and vehicles). It is well known that platinum particles deposited on a conventional refractory alumina can grow into submicron size via a well-established Oswald ripening mechanism. Hence, more research on stabilizing platinum using an appropriate support material is needed. Accordingly, it is an object of the presently claimed invention to provide a platinum-rhodium based catalyst which is essentially free of palladium and exhibits high temperature hydrothermal stability at an aging temperature of >950° C., and which has an equal or improved efficacy in controlling automobile emissions, compared to the palladium-rhodium based catalyst.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

FIG. 1 is a schematic representation of the catalytic article design in an exemplary configuration according to one embodiment of the presently claimed invention.

SUMMARY OF THE INVENTION

Figure 2:
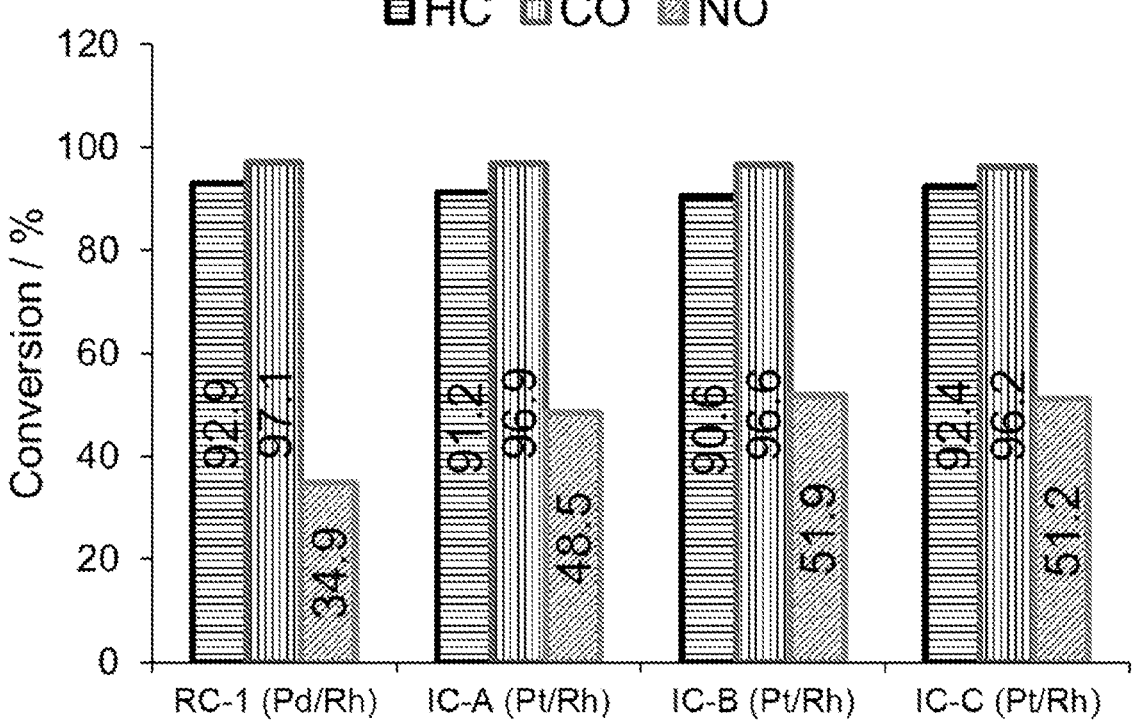
FIG. 2 is a graph showing comparative test results for THC, NO, and CO conversion the invention catalysts and a reference catalyst.

In accordance with the presently claimed invention there is provided a catalytic article comprising platinum supported on a first support comprising a ceria containing metal oxide component; rhodium supported on a second support selected from a refractory alumina component, an oxygen storage component or a combination thereof; and a substrate, wherein said catalytic article is essentially free of palladium.

In accordance with another aspect of the presently claimed invention, there is provided a process for the preparation of the catalytic article according to the presently claimed invention, wherein said process comprises preparing a slurry comprising platinum supported on a first support comprising a ceria containing metal oxide component and rhodium supported on a second support selected from a refractory alumina component, an oxygen storage component or a combination thereof; depositing the slurry on a substrate to obtain a catalytic article followed by calcination at a temperature ranging from 400 to 700° C., wherein the step of preparing the slurry comprises a technique selected from incipient wetness impregnation, incipient wetness co-impregnation, and post-addition.

In accordance with another aspect of the presently claimed invention, there is provided an exhaust gas treatment system for internal combustion engines, said system comprising the catalytic article according to the presently claimed invention.

In accordance with another aspect of the presently claimed invention, there is provided a method of treating a gaseous exhaust stream comprising hydrocarbons, carbon monoxide, and nitrogen oxide, the method comprising contacting the exhaust stream with the catalytic article according to the presently claimed invention.

In accordance with another aspect of the presently claimed invention, there is provided a method of reducing hydrocarbons, carbon monoxide, and nitrogen oxide levels in a gaseous exhaust stream, the method comprising contacting the gaseous exhaust stream with the catalytic article according to the presently claimed invention or the exhaust gas treatment system according to the presently claimed invention to reduce the levels of hydrocarbons, carbon monoxide, and nitrogen oxide in the exhaust gas.

In accordance with another aspect of the presently claimed invention, there is provided use of the catalytic article according to the presently claimed invention or the exhaust gas treatment system according to the presently claimed invention for purifying a gaseous exhaust stream comprising hydrocarbons, carbon monoxide, and nitrogen oxide.

DETAILED DESCRIPTION

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The present invention provides a bi-metallic catalytic article comprising two platinum group metals (PGM) in which a high amount of platinum can be used to substitute palladium entirely.

The platinum group metal (PGM) refers to any component that includes a PGM (Ru, Rh, Os, Ir, Pd, Pt and/or Au). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

The term "catalyst" or "catalytic article" or "catalyst article" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM composition(s) in a layered fashion. These composition(s) may be referred to as washcoat(s).

The term "$NO_x$" refers to nitrogen oxide compounds, such as NO, $N_2O$ and/or $NO_2$.

The presently claimed invention addresses the problem of replacing palladium with platinum in conventional palladium-rhodium catalysts without affecting the overall catalyst performance and provides a platinum-rhodium based catalyst which is essentially free of palladium and comprises an optimized support for stabilizing platinum. The catalyst thus, provided has a high temperature hydrothermal stability at an aging temperature of >950° C. The issue of platinum sintering, when doped on alumina, can be resolved by using ceria as a support. Platinum may form a monolayer, oftentimes partially or fully oxidized on the ceria surface due to strong $PtO$—$CeO_2$ interaction. However, bulk ceria itself can undergo sintering upon high temperature aging. Accordingly, the present invention addresses the aforesaid issue and provides a ceria-alumina composite as a platinum support for a TWC catalyst. Platinum is selectively deposited on the ceria-alumina composite which provides optimal three-way catalytic performance and prevents platinum from migrating to other catalytic components. The PGM components are allocated on different supports for optimal utilization of platinum for three-way conversion catalysis after high temperature aging on a gasoline engine.

Figure 5A:
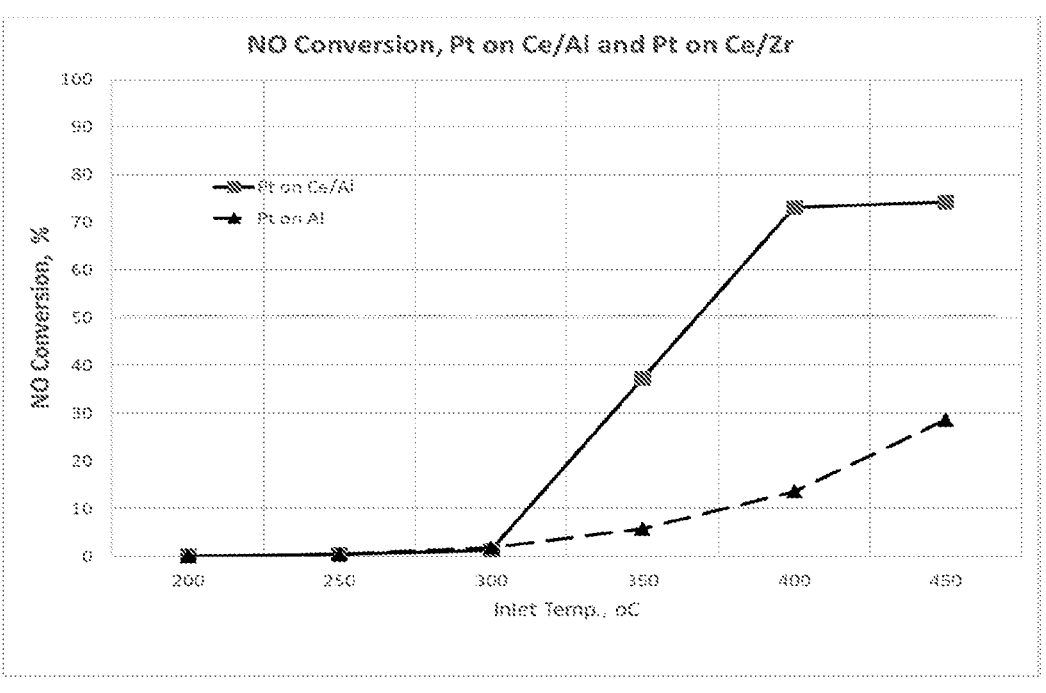
FIGS. 5A, 5B and 5C illustrate comparative stability study of Pt catalyst supported on ceria-alumina and Pt catalyst supported on an alumina.
Figure 5B:
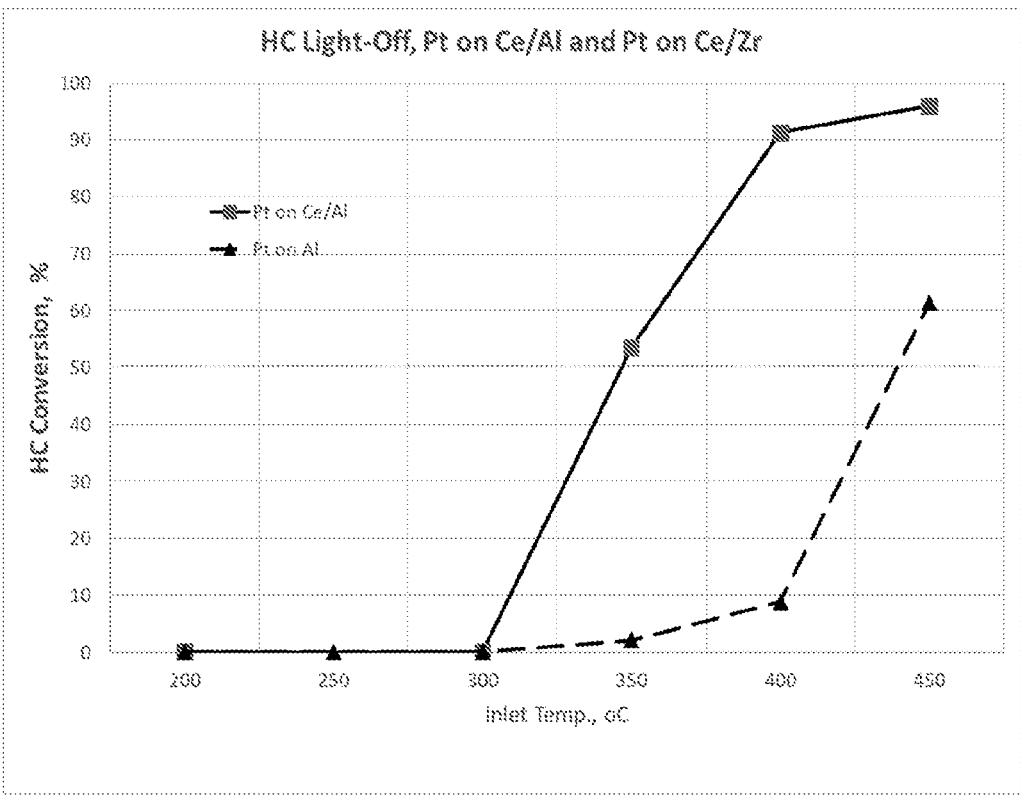
Figure 5C:
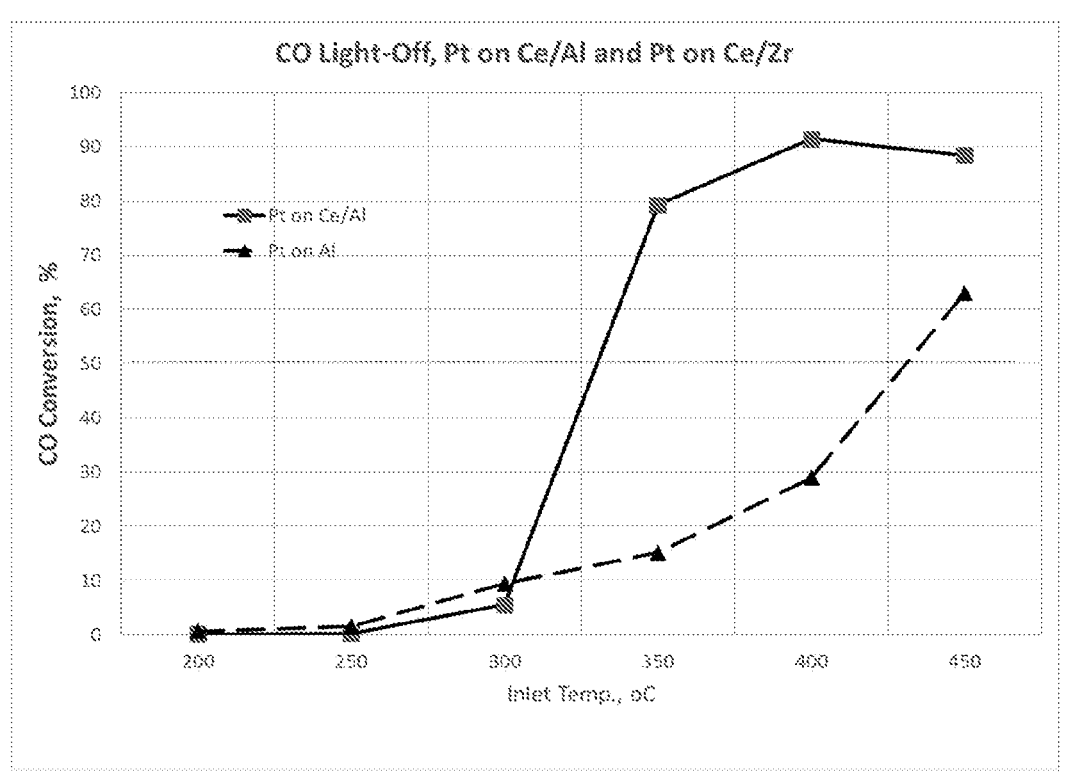

Accordingly, the presently claimed invention provides a catalytic article comprising platinum supported on a first support comprising a ceria containing metal oxide component; rhodium supported on a second support selected from a refractory alumina component, an oxygen storage component or a combination thereof; and a substrate, wherein said catalytic article is essentially free of palladium. As used herein the term "essentially free of palladium" refers to no external addition of palladium in the catalytic article, however it may optionally be present as a fractional amount such as an amount of <0.1 wt. %. In one embodiment, the first support further comprises a refractory alumina component. In one embodiment, the catalytic article comprises platinum supported on a first support comprising a ceria containing metal oxide component and refractory alumina component; rhodium supported on a second support selected from a refractory alumina component, an oxygen storage component or a combination thereof; and a substrate, wherein said catalytic article is essentially free of palladium. In one embodiment, the presently claimed catalytic article exhibits high temperature hydrothermal stability at an aging temperature of >950° C. The stability study results are provided in FIG. 5.

In embodiment, the amount of platinum is in the range of 0.1 to 10.0 wt. %, based on the total weight of the first support, and the amount of rhodium is in the range of 0.1 to 10.0 wt. %, based on the total weight of the second support. In one embodiment, the first support comprises a stabilized alumina. In one embodiment, the stabilizing agent used to make the stabilized alumina include but is not limited to lanthana, barium, strontium and the like. In another embodiment, the refractory metal oxide support further comprises lanthanum-zirconium, zirconium, alumina-zirconium, titanium oxide, iron oxide, yttrium oxide, and any combination thereof.

In one embodiment, the ceria containing metal oxide component is used as a support for platinum which comprises ceria-alumina, ceria-yttrium-alumina, ceria-silica-alumina, ceria-tin-alumina, ceria-manganese alumina, ceria-iron-alumina, ceria-nickel-alumina, ceria-iridium-alumina, ceria-ruthenium-alumina, ceria-indium-alumina, ceria-titania-alumina ceria-titania or any combination thereof. In another embodiment, the ceria containing metal oxide component comprises ceria-zirconia.

In one embodiment, the ceria containing metal oxide component comprises ceria-alumina or ceria-yttrium-alumina. In one preferred embodiment, the ceria containing metal oxide component comprises ceria-alumina. In one embodiment. the ceria content of the ceria-containing metal oxide component is in the range of 1.0 to 80 wt. %, based on the total weight of the ceria-containing metal oxide component. In one embodiment, the ceria content of the ceria-containing metal oxide component is in the range of 5.0 to 50 wt. %, based on the total weight of the ceria-containing component. In one embodiment, the ceria content of the ceria-containing metal oxide component is in the range of 5.0 to 30 wt. %, based on the total weight of the ceria-containing component.

In one embodiment, the oxygen storage compound is a material that changes its valence by storing and releasing oxygen depending on the partial pressure of oxygen in the operating environment. For gasoline vehicles, the environment in the exhaust gas treatment system is constantly changing, perturbating around a lambda value equivalent to 1. The lambda value is defined by the ratio of oxygen content to the combination of CO and HC contents, and is measured by a lambda sensor. In the modern gasoline vehicle setup, two lambda sensors are used. One is located in front of the TWC catalyst, and one behind. When the lambda value, detected by the sensor in front of the TWC, is greater than 1, it indicates that the engine is operating with more oxygen needed for combustion of CO and HC in the cylinder chamber, which is good for the reduction of CO/HC emissions. When the lambda value, detected by the sensor in front of the TWC, is less than 1, it means that the engine is operating with an insufficient amount of oxygen needed for combustion of CO and HC in the cylinder chamber, which is good for the reduction of NOx emissions. To balance the overall CO/HC/NOx emissions, modern vehicles are operating under a tight lambda perturbation of around 1. However, to accommodate the acceleration and stop-go scenarios encountered in real world driving conditions, which will cause a wide perturbation in lambda values, resulting in poor catalyst performance, an oxygen storage compound is needed to minimize the lambda perturbation during such extreme driving conditions. While ceria is well-known for its good oxygen storage capability, it has a poor thermal stability. Modern vehicles, in providing the customer with long duration warranties, need a catalyst with good long-lasting durability. Hence, a high temperature aging durability (>950° C.) for the modern TWC catalysts is required from the OEMs. Toward this end, zirconium-stabilized ceria was introduced as a means to meet these requirements.

"Oxygen storage component, that exhibits an oxygen storage capability and often is an entity that has multi-valent oxidation states and can actively release oxygen under an oxygen depleted environment and be re-oxidized (restore oxygen) under an oxygen enriched environment. Examples of suitable oxygen storage components include ceria and praseodymia and combinations thereof.

In some embodiments, the OSC is a mixed metal oxide composite, comprising ceria and/or praseodymia in combination with other metal oxides. Certain metal oxides that can be included in such mixed metal oxides are: zirconium oxide $(ZrO_2)$, titania $(TiO_2)$, yttria $(Y_2O_3)$, neodymia $(Nd_2O_3)$, lanthana $(La_2O_3)$, or mixtures thereof. For example, a "ceria-zirconia composite" means a composite comprising ceria and zirconia. In some embodiments, the ceria content in a mixed metal oxide composite ranges from about 25% to about 95%, by weight of the total mixed metal oxide composite.

In some embodiments, the total ceria or praseodymia content in the OSC ranges from about 5% to about 99.9%, preferably from about 5% to about 70%, even more preferably from about 10% to about 50% by weight of the total mixed metal oxide composite.

In one embodiment, the second support is a combination of a refractory alumina component and an oxygen storage component. In one embodiment. the refractory alumina component comprises alumina, lanthana-alumina, ceria-alumina, titania-alumina, ceria-zirconia-alumina, zirconia-alumina, lanthana-zirconia-alumina, baria-alumina, baria-lanthana-alumina, baria-lanthana-neodymia-alumina, or any combination thereof. In one embodiment. the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof. In one embodiment, the oxygen storage component comprises ceria in an amount of 5.0 to 100 wt. %, based on the total weight of the oxygen storage component. In one embodiment, the second support further comprises stabilized alumina.

In one embodiment, the catalytic article is a single layered catalytic article. In one embodiment, the catalytic article is a bi-layered article comprising a first layer, a second layer, and a substrate, wherein the first layer comprises platinum supported on a ceria containing metal oxide component and a refractory alumina component, deposited on the substrate, and the second layer comprises rhodium supported on a second support selected from a refractory alumina component, an oxygen storage component or a combination thereof, deposited on the first layer. In one embodiment, the catalytic article is a bi-layered article comprising a first layer, a second layer, and a substrate, wherein the first layer comprises rhodium supported on a second selected from a refractory alumina component, an oxygen storage component or a combination thereof support deposited on the substrate, and the second layer comprises platinum supported on a ceria containing metal oxide component and a refractory alumina component, deposited on the first layer. In one embodiment, the catalytic article is loaded with 1.0 to 300 g/ft$^3$ of platinum supported on the ceria containing metal oxide component and 1.0 to 100 g/ft$^3$ of rhodium supported on a support selected from a refractory alumina component, an oxygen storage component or any combination thereof.

In one embodiment. platinum is thermally or chemically fixed.

In one embodiment, the catalytic article is essentially free of barium oxide. As used herein the term "essentially free of barium oxide" refers to no external addition of barium oxide, however, it may optionally, be present as a fractional amount such as an amount of <0.001 wt. %.

In one exemplary embodiment, the catalytic article comprises platinum supported on a first support comprising a ceria-alumina and a stabilized alumina component; rhodium supported on a second support comprising a stabilized alumina and an oxygen storage component containing ceria-zirconia; and a substrate, wherein said catalytic article is essentially free of palladium, wherein the catalytic article is single-layered, wherein the ceria content of the ceria-alumina is in the range of 5.0 to 50 wt. %, based on the total weight of the ceria-alumina, wherein the oxygen storage component comprises ceria in an amount of 5.0 to 100 wt. %, based on the total weight of the oxygen storage component, wherein the amount of platinum is in the range of 0.1 to 10.0 wt. %, based on the total weight of the first support and the amount of rhodium is in the range of 0.1 to 10.0 wt. %, based on the total weight of the second support.

In one exemplary embodiment, the catalytic article comprises platinum supported on a first support comprising a ceria-zirconia and a stabilized alumina component; rhodium supported on a second support comprising a stabilized alumina and an oxygen storage component containing ceria-zirconia; and a substrate, wherein said catalytic article is essentially free of palladium, wherein the catalytic article is single-layered, wherein the ceria content of the ceria-zirconia is in the range of 5.0 to 50 wt. %, based on the total weight of the ceria-alumina, wherein the oxygen storage component comprises ceria in an amount of 5.0 to 100 wt. %, based on the total weight of the oxygen storage component, wherein the amount of platinum is in the range of 0.1 to 10.0 wt. %, based on the total weight of the first support and the amount of rhodium is in the range of 0.1 to 10.0 wt. %, based on the total weight of the second support.

In one embodiment, the substrate is selected from a ceramic substrate, a metal substrate, a ceramic foam substrate, a polymer foam substrate and a woven fibre substrate.

As used herein, the term "substrate" refers to the monolithic material onto which the catalyst composition is placed, typically in the form of a washcoat containing a plurality of particles containing a catalytic composition thereon.

Reference to "monolithic substrate" or "honeycomb substrate" means a unitary structure that is homogeneous and continuous from the inlet to the outlet.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalytic article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours).

In one embodiment, the substrate of the catalytic article of the presently claimed invention may be constructed of any material typically used for preparing automotive catalysts and typically comprises a ceramic or a metal monolithic honeycomb structure.

The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 6A:
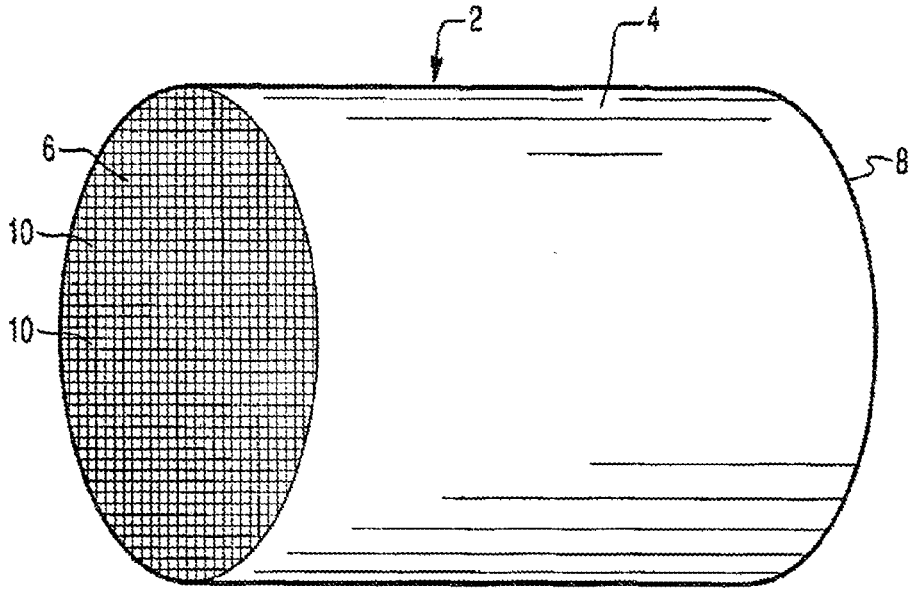
FIG. 6A is a perspective view of a honeycomb-type substrate carrier which may comprise the catalyst composition in accordance with one embodiment of the presently claimed invention.
Figure 6B:
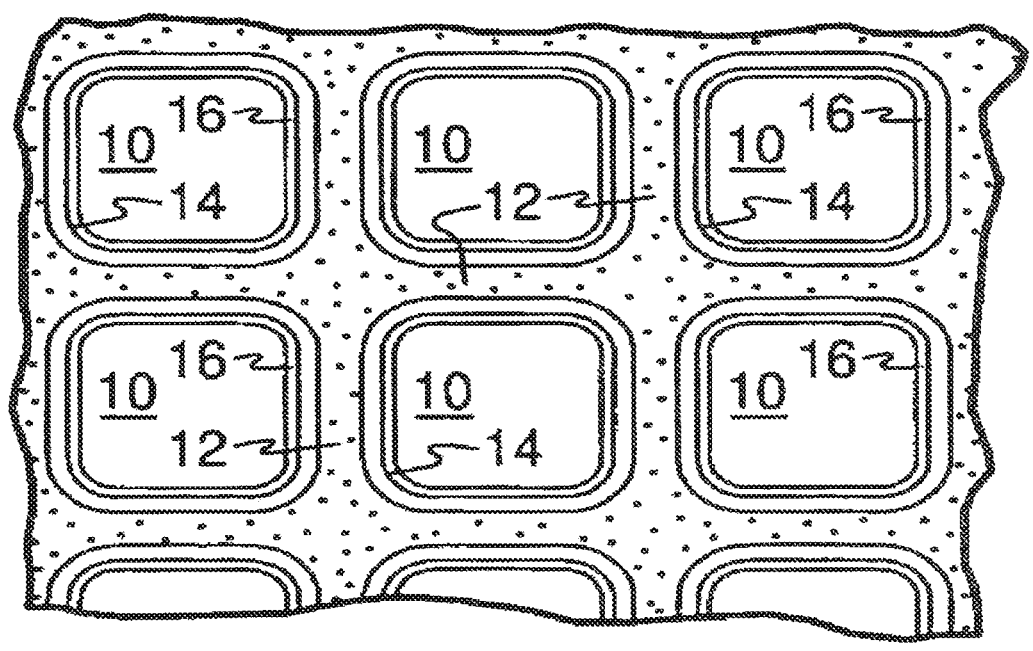
FIG. 6B is a partial cross-section view enlarged relative to FIG. 6A and taken along a plane parallel to the end faces of the substrate carrier of FIG. 6A, which shows an enlarged view of a plurality of the gas flow passages shown in FIG. 6A.

FIGS. 6A and 6B illustrate an exemplary substrate 2 in the form of a flow-through substrate coated with washcoat compositions as described herein. Referring to FIG. 6A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 6B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 6B, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 7:
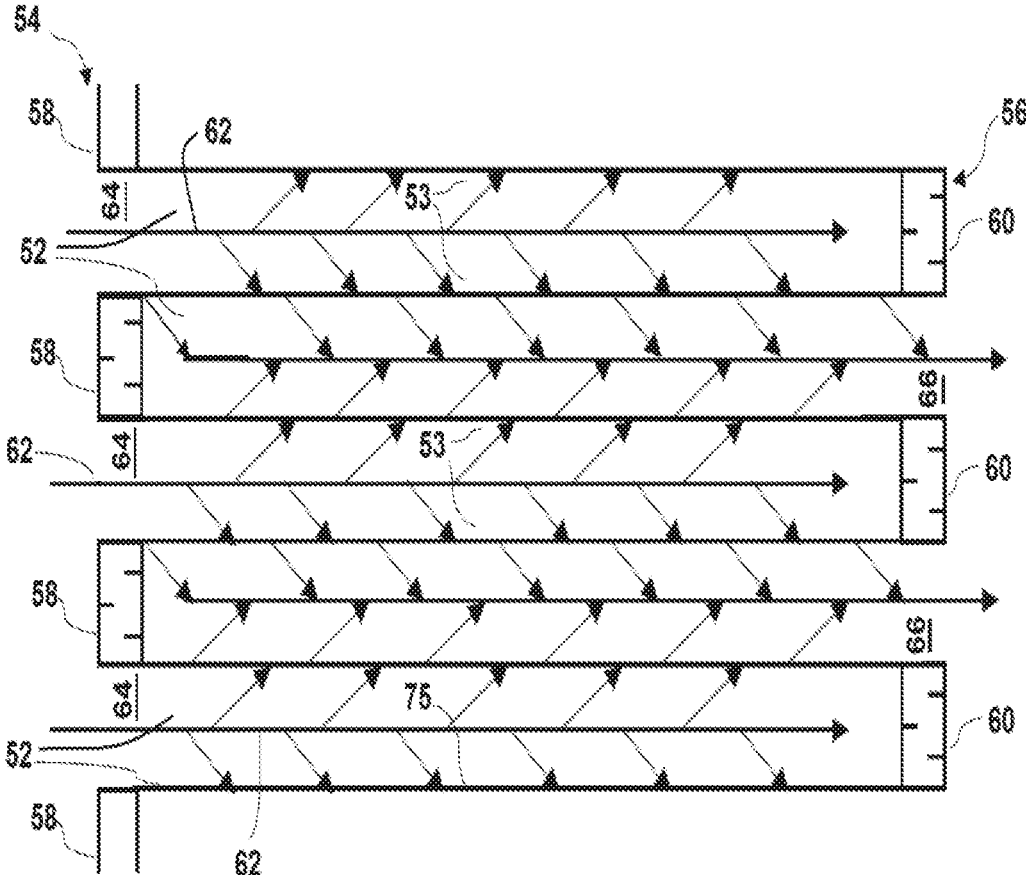
FIG. 7 is a cutaway view of a section enlarged relative to FIG. 6A, wherein the honeycomb-type substrate in FIG. 6A represents a wall flow filter substrate monolith.

FIG. 7 illustrates an exemplary substrate 2 in the form of a wall flow filter substrate coated with a washcoat composition as described herein. As seen in FIG. 7, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In accordance with another aspect of the presently claimed invention, the presently claimed invention provides a process for preparing the catalytic article. In one embodiment, the process involves the following steps:

In the first step, a slurry comprising platinum supported on a first support comprising ceria comprising a metal oxide component and optionally a refractory metal oxide; and rhodium supported on a second support selected from a refractory alumina component, an oxygen storage component or a combination thereof is prepared. In the next step, the slurry is deposited on a substrate to obtain a catalytic article followed by calcination at a temperature ranging from 400 to 700° C. In one embodiment, the step of preparing the slurry comprises a technique selected from incipient wetness impregnation, incipient wetness co-impregnation, and post-addition.

In one embodiment, the process for preparing the catalytic article comprises preparing a first layer slurry comprising platinum supported on a first support comprising a ceria containing metal oxide component and optionally a refractory alumina component and a second layer slurry comprising rhodium supported on a second support selected from a refractory alumina component, an oxygen storage component or a combination thereof; depositing the first layer slurry on a substrate to obtain a first layer and depositing the second layer slurry on the first layer to obtain a second layer, followed by calcination at a temperature ranging from 400 to 700° C., wherein the step of preparing the slurry comprises a technique selected from incipient wetness impregnation, incipient wetness co-impregnation, and post-addition.

In one embodiment, the process involves a pre-step of thermal or chemical fixing of platinum on a support. The thermal fixing involves deposition of the platinum onto a support, e.g. via incipient wetness impregnation method, followed by the thermal calcination of the resulting platinum/support mixture. As an example, the mixture is calcined for 1-3 hours at 400-700° C. with a ramp rate of 1-25° C./min.

The chemical fixing involves deposition of platinum onto a support followed by a fixation using an additional reagent to chemically transform platinum.

Incipient wetness impregnation techniques, also called capillary impregnation or dry impregnation are commonly used for the synthesis of heterogeneous materials, i.e., catalysts.

Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1.0-5.0 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a $D_{90}$ particle size of about 3 to about 40 microns, preferably 10 to about 30 microns, more preferably about 10 to about 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10.0 vol. % water in an alternating hydrocarbon/air feed for 20-100 hours. Aged catalyst articles are thus provided in certain embodiments. In certain embodiments, particularly effective materials comprise metal oxide-based supports (including, but not limited to substantially 100% ceria supports) that maintain a high percentage (e.g., about 80-100%) of their pore volumes upon aging (e.g., at about 850° C. to about 1050° C., 10 vol. % water in an alternating hydrocarbon/air feed, 20-100 hours aging).

In accordance with another aspect of the presently claimed invention, there is provided an exhaust gas treatment system for internal combustion engines. The exhaust gas treatment system comprises the catalytic article according to the presently claimed invention. In one embodiment, the catalytic article according to the presently claimed invention is used at a first close-coupled position (CC1). In another embodiment, the catalytic article according to the presently claimed invention is used at a second close-coupled position (CC2). In one embodiment, the catalytic article according to the presently claimed invention is used as an under-floor catalyst (UF). In one embodiment, the exhaust gas treatment system comprises a platinum group metal based three-way conversion (TWC) catalytic article and the catalytic article according to the present invention, wherein the platinum group metal based three-way conversion (TWC) catalytic article is positioned downstream from an internal combustion engine and the catalytic article is positioned downstream in fluid communication with the platinum group metal based three-way conversion (TWC) catalytic article.

In another embodiment, the exhaust gas treatment system comprises a platinum group metal based three-way conversion (TWC) catalytic article and the catalytic article according to the present invention, wherein the layered catalytic article is positioned downstream from an internal combustion engine and the platinum group metal based three-way conversion (TWC) catalytic article is positioned downstream in fluid communication with the three-way conversion (TWC) catalytic article.

In accordance with another aspect of the presently claimed invention, there is provided a method of treating a gaseous exhaust stream comprising hydrocarbons, carbon monoxide, and nitrogen oxide, the method comprises contacting the exhaust stream with the catalytic article according to the presently claimed invention. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically comprises combustion products, products of incomplete combustion, oxides of nitrogen, combustible and/or carbonaceous particulate matter (soot) and unreacted oxygen and/or nitrogen. Such terms refer as well as to the effluent downstream of one or more other catalyst system components as described herein.

In accordance with another aspect of the presently claimed invention, there is provided a method of reducing hydrocarbons, carbon monoxide, and nitrogen oxide levels in a gaseous exhaust stream, the method comprises contacting the gaseous exhaust stream with the catalytic article according to the presently claimed invention or the exhaust gas treatment system according to the presently claimed invention to reduce the levels of hydrocarbons, carbon monoxide, and nitrogen oxide in the exhaust gas.

In accordance with another aspect of the presently claimed invention, there is provided use of the catalytic article according to the presently claimed invention or the exhaust gas treatment system according to the presently claimed invention for purifying a gaseous exhaust stream comprising hydrocarbons, carbon monoxide, and nitrogen oxide.

In some embodiments, the catalytic article converts at least about 60%, or at least about 70%, or at least about 75%, or at least about 80%, or at least about 90%, or at least about 95% of the amount of carbon monoxide, hydrocarbons and nitrous oxides present in the exhaust gas stream prior to contact with the catalytic article. In some embodiment, the catalytic article converts hydrocarbons to carbon dioxide and water. In some embodiments, the catalytic article converts at least about 60%, or at least about 70%, or at least about 75%, or at least about 80%, or at least about 90%, or at least about 95% of the amount of hydrocarbons present in the exhaust gas stream prior to contact with the catalytic article. In some embodiment, the catalytic article converts carbon monoxide to carbon dioxide. In some embodiment, the catalytic article converts nitrogen oxides to nitrogen.

In some embodiments, the catalytic article converts at least about 50%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

EXAMPLES

Aspects of the presently claimed invention are more fully illustrated by the following examples, which are set forth to illustrate certain aspects of the present invention and are not to be construed as limiting thereof.

Example 1: Preparation of a Reference Catalytic Article (RC-1, Bimetallic Catalyst: Pd:Rh (20.4:13.6))

A Pd/Rh-based TWC catalytic article was prepared as a close-coupled catalyst. The total PGM loading (Pt/Pd/Rh) is 0/20.4/13.6. It is a single-layer catalyst with a washcoat loading of 2.9 g/inch$^3$. The Pd-containing washcoat was prepared by impregnating Pd-nitrate solution (20%, 5.7 grams) on a mixture of stabilized alumina (138 grams) and ceria-zirconia (OSC, 40% Ce, 18 grams). The Pd impregnated powder was made into a slurry with 170 grams of water. This slurry was then milled to a washcoat with a $D_{90}$ of below 10 $\mu$m and a pH of around 4-5 by addition of nitric acid. The Rh-containing washcoat was prepared similarly by impregnating Rh-nitrate solution (10%, 8 grams) on a mixture of stabilized alumina (49 grams) and ceria-zirconia (40% Ce, 76 grams). The Rh-impregnated powders were added into a mixture of 50 grams of water and zirconium acetate (used as a binder) to form a slurry. The Rh-containing slurry was then milled into a washcoat with a $D_{90}$ of below 10 $\mu$m, and a pH of around 4-5 by addition of acetic acid. The Rh-containing washcoat was subsequently added into the Pd-containing slurry with Sr-acetate and Ba-acetate (9 and 7 grams, respectively) to obtain a mixed slurry. About 19 grams of NiO powder was added into the mixed slurry to obtain a final slurry. The catalytic article was prepared by coating the combined slurries onto a 400 cpsi/4 mil ceramic substrate. The obtained coated substrate was then dried and calcined for 2 hours at 500° C.

Example 2: Preparation of a Catalytic Article (IC-A, Bimetallic, Pt and Rh in a Single Layer Catalyst (Ratio: 20.4:0:13.6), No Thermal Fixing)

A catalytic article was formulated using Pt and Rh to yield a 20.4/0/13.6 design. The total PGM loading is 34 g/ft$^3$ and the washcoat loading is 2.9 g/inch$^3$. The catalyst preparation procedure was similar to example 1 (CC2-RC-1), except that Pt was used instead of Pd. There was no thermal fixing of precious metals onto the support. The catalytic article was prepared by coating the slurry onto 400/4 ceramic substrates. The obtained coated substrate was then dried and calcined for 2 hours at 500° C.

Example 3: Preparation of a Catalytic Article (IC-B, Bimetallic —Pt and Rh, without the Use of Alkali Earth Metals)

A catalytic article was formulated using Pt and Rh to yield a 20.4/0/13.6 design. The total PGM loading is 34 g/ft$^3$. The washcoat loading of the catalytic article is 2.84 g/inch$^3$. The catalyst preparation procedure was similar to that of example 2, except that no alkali-earth compounds were used. The catalytic article was prepared by coating the slurry onto a 400/4 ceramic substrate. The obtained coated substrate was then dried and calcined for 2 hours at 500° C.

Example 4: Preparation of an Invention Catalytic Article (IC-C, Bimetallic —Pt and Rh, without the Use of Alkali Earth Metals, and Replacing Ce—Zr with Ce—Al)

A catalytic article was formulated using Pt and Rh to yield a 20.4/0/13.6 design. The total PGM loading is 34 g/ft$^3$. The washcoat loading of the catalytic article is 2.84 g/inch$^3$. The catalyst preparation procedure is similar to that of example 2, except that no alkali-earth compounds were used. Also, one of the Pt supports, Ce—Zr, was replaced with Ce—Al (50% Ce). The catalytic article was prepared by coating the slurry onto a 400/4 ceramic substrate. The obtained coated substrate was then dried and calcined for 2 hours at 500° C. The catalytic articles IC-A, IC-B and IC-C are illustrated in FIGS. 1A, 1B and 1C, whereas the reference catalytic article is illustrated in FIG. 1D of the accompanying drawings.

Example 5: Aging of the Catalysts

The catalytic articles according to examples 2-4 and the reference catalytic article according to example 1 were aged in a tube furnace that is capable of generating an inlet gas flow with a gas mixture representing rich and lean perturbation resembling the stoichiometric driving conditions observed in a gasoline vehicle, along with expected fuel-cut cycles. The furnace temperature was generated by butane fuel injection in front of the targeted catalyst. The inlet aging temperature for the above set of catalysts was set at 875° C. with an exotherm peak temperature at 950° C. The aging duration was set to 20 hours.

Example 6: Comparative Testing

The catalytic articles according to examples 2-4, along with the reference catalytic article according to example 1 were evaluated after aging in a reactor (Gasoline Vehicle Simulator—GVS) that is capable of simulating vehicle driving conditions such as temperature, flow rate (speed), and exhaust gas components (CO, HC, NO, H$_2$O, CO$_2$, etc.), under the Federal Testing Procedure 1972 (FTP-72). The comparative testing results are provided in table 1 and FIG. 2.

TABLE 1

| Comparative GVS results for aged catalytic articles | | | |
|---|---|---|---|
| Catalyst | HC Conversion, % | CO Conversion, % | NO Conversion, % |
| RC-1 (Pd/Rh) | 92.9 | 97.1 | 34.9 |
| IC-C (Pt/Rh) | 92.4 | 96.2 | 51.2 |
| IC-A (Pt/Rh) | 91.2 | 96.9 | 48.5 |
| IC-B (Pt/Rh) | 90.6 | 96.6 | 51.9 |

RC: Reference Catalyst,
IC: Invention Catalyst

The results shown in table 1 indicate that the Pt/Rh catalytic article according the presently claimed invention can outperform the Pd/Rh reference catalytic article in NO conversion, without compromising HC/CO performance. The overall performance of the illustrative invention catalyst (IC-C) is found to be superior compared to other invention catalysts (IC-B and IC-A). Further, powdered catalysts containing Pt supported on different supports were prepared and tested. A first catalyst containing Pt deposited on Ce—Al and a second catalyst containing Pt deposited on Ce—Zr were prepared with a total rare-earth concentration at 45% (40% Ce and 5% La). These powders were aged in a furnace under rich/lean perturbation (10 min air, 10 min 4% H$_2$/N$_2$) with steam (10%) for 5 hours, at a temperature of 980° C. After aging, these powders were evaluated in a reactor under a light-off protocol at stoichiometric ($\lambda$=1) with lean/rich perturbations at 1 Hz ($\lambda$=1.025 & $\lambda$=0.975) and a feed gas composition consisting of:

| | Lean ($\lambda$ = 1.025) | Rich ($\lambda$ = 0.975) |
|---|---|---|
| CO [%] | 0.7 | 2.33 |
| H$_2$ [%] | 0.22 | 0.77 |
| O$_2$ [%]* | 1.8 ± $\Delta$ | 0.7 ± $\Delta$ |
| HC (propene:propane 2:1) [ppm C1] | 3000 | |
| NO [ppm] | 1500 | |

Figure 3A:
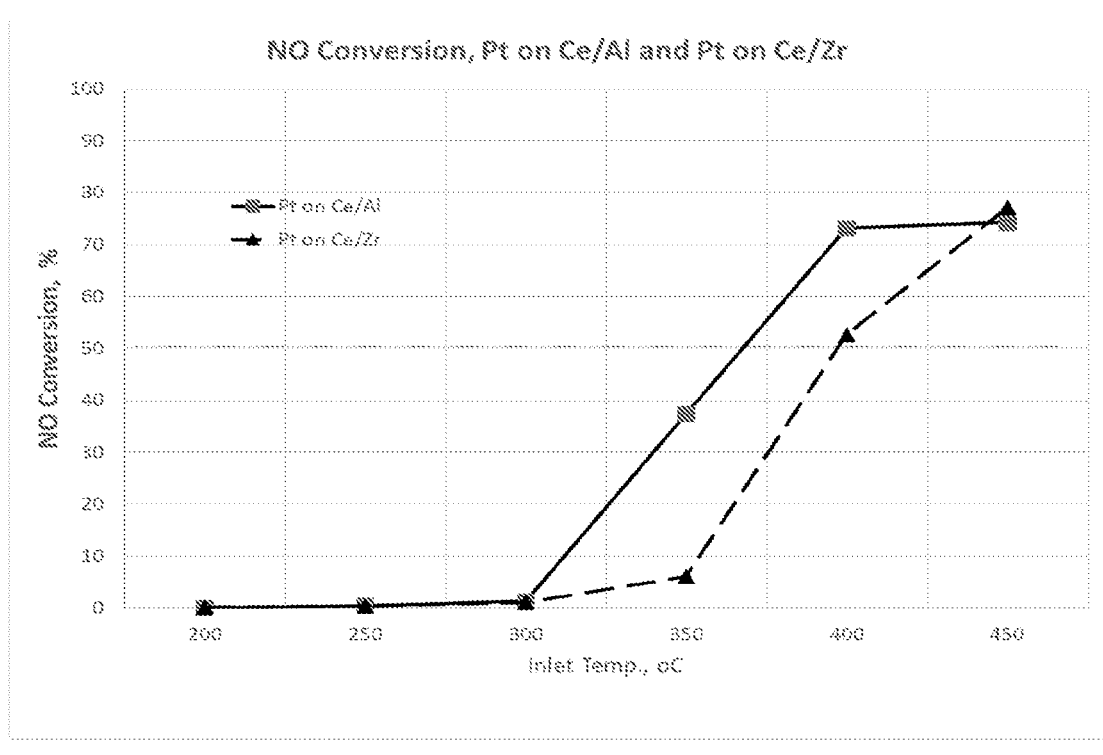
FIG. 3A illustrates comparative NO conversion of Pt catalyst supported on ceria-alumina and Pt catalyst supported on ceria-zirconia.
Figure 3B:
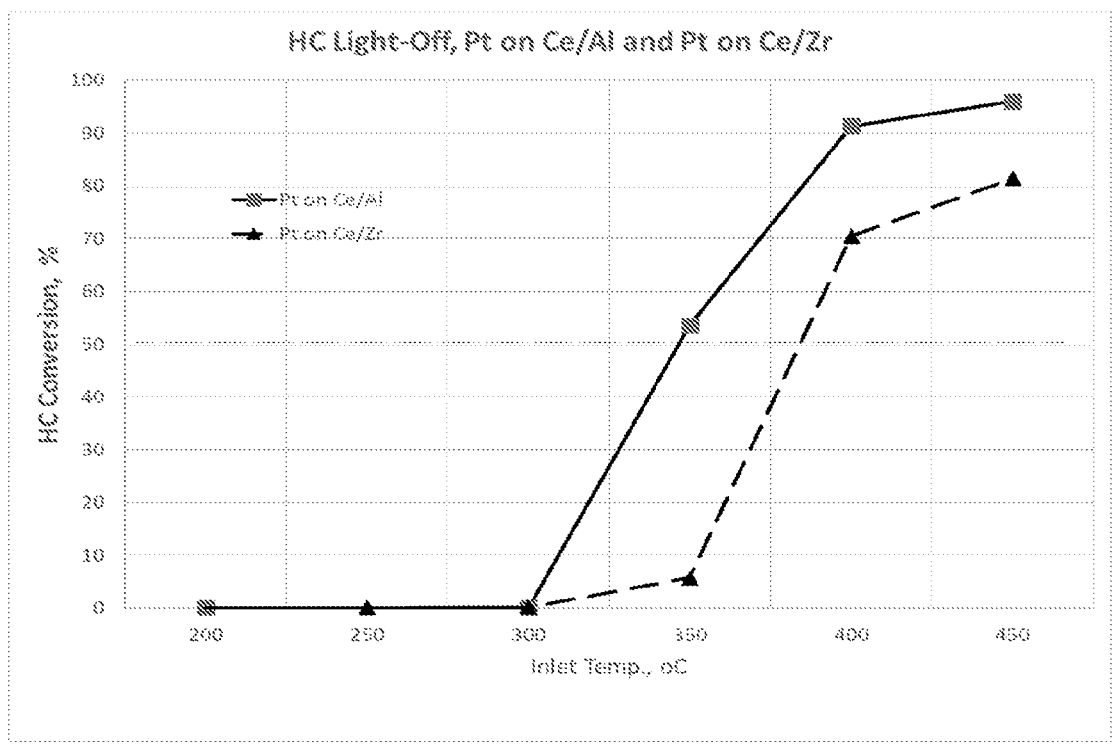
FIG. 3B illustrates comparative HC light-off of Pt catalyst supported on ceria-alumina and Pt catalyst supported on ceria-zirconia.

The results, shown in FIGS. 3A & 3B, indicate that Pt on Ce—Al outperforms Pt on Ce—Zr support in NO and HC conversion during the steady-state light-off test.

Figure 4A:
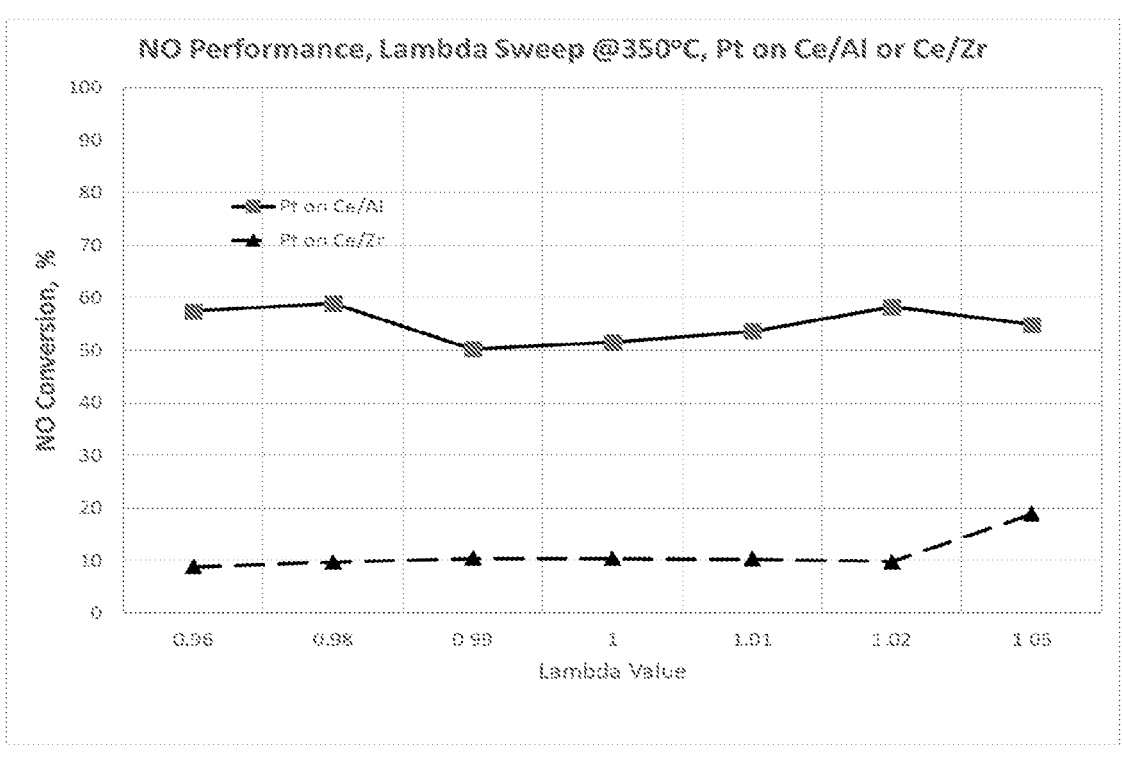
FIG. 4A illustrates comparative A sweep NO conversion of Pt catalyst supported on ceria-alumina and Pt catalyst supported on ceria-zirconia.
Figure 4B:
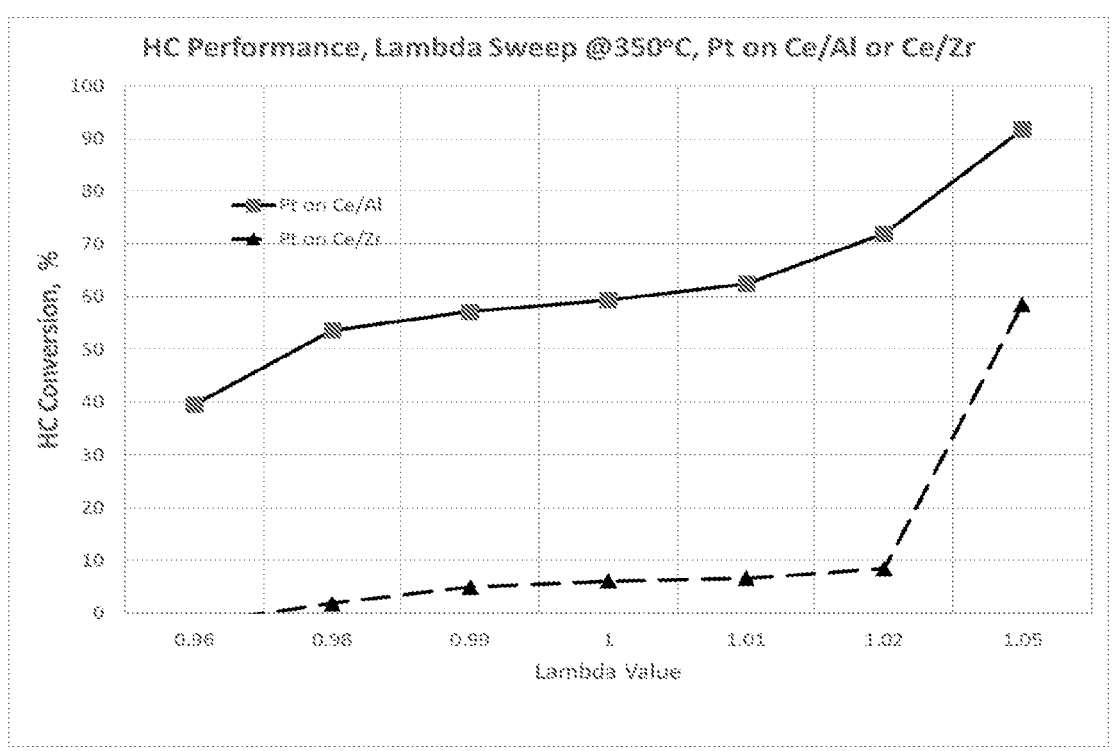
FIG. 4B illustrates comparative A sweep HC conversion of Pt catalyst supported on ceria-alumina and Pt catalyst supported on ceria-zirconia.

These catalyst samples were also evaluated under a lambda-sweep test. The $\lambda$ sweep test is a test to evaluate the catalyst response to the lean/rich perturbations observed in gasoline vehicles. Usually, this evaluation is conducted at a temperature higher than the catalyst VO temperature. A sweep from rich to lean was conducted at 350° C. The results, shown in FIGS. 4A & 4B, clearly demonstrate that ceria-alumina (Ce—Al) is a better support than ceria-zirconia (Ce—Zr) for Pt, for overall performance improvement.

Example 7: Testing of Supports for Pt

Two supports, a standard high surface area alumina support (SA: >150M$^2$/g) and a Ce—Al (50% Ce, same as IC-C) were used to check stabilization of Pt. 1% Pt was impregnated onto both the supports separately and aged. A standard steady-state light-off test was performed to see if Pt/Ce—Al can withstand the high temperature aging better than Pt/Al. Results, shown in FIGS. 5A, 5B and 5C, indicate that the Ce—Al support helps to stabilize Pt to against high temperature aging.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

The invention claimed is:

1. A catalytic article comprising:
a bi-layered article comprising:
platinum supported on a first support comprising a ceria containing metal oxide component selected from ceria-alumina, ceria-yttrium-alumina, ceria-silica-alumina, ceria-tin-alumina, ceria-manganese alumina, ceria-iron-alumina, ceria-nickel-alumina, ceria-iridium-alumina, ceria-ruthenium-alumina, ceria-indium-alumina, ceria-titania-alumina ceria-titania, or any combination thereof, wherein the ceria content of the ceria-containing metal oxide component ranges from 1.0 wt. % to 80.0 wt. %, based on the total weight of the ceria-containing metal oxide component;
rhodium supported on a second support chosen from a refractory alumina component, an oxygen storage component, and a combination thereof; and
a substrate,
wherein the catalytic article is essentially free of palladium; and
wherein the catalytic article exhibits hydrothermal stability at an aging temperature of greater than 950° C.

2. The catalytic article according to claim 1, wherein the first support further comprises a refractory alumina component.

3. The catalytic article according to claim 1, wherein the second support comprises a combination of a refractory alumina component and an oxygen storage component.

4. The catalytic article according to claim 1, wherein the catalytic article is a bi-layered article comprising a first layer, a second layer, and a substrate, wherein the first layer comprises platinum supported on a ceria containing metal oxide component and a refractory alumina component, deposited on the substrate, and the second layer comprises rhodium supported on a support chosen from a refractory alumina component, an oxygen storage component, and a combination thereof, deposited on the first layer.

5. The catalytic article according to claim 1, wherein the catalytic article is a bi-layered article comprising a first layer, a second layer, and a substrate, wherein the first layer comprises rhodium supported on a support chosen from a refractory alumina component, an oxygen storage component, and a combination thereof, deposited on the substrate, and the second layer comprises platinum supported on a ceria containing metal oxide component and refractory alumina component deposited on the first layer.

6. The catalytic article according to claim 1, wherein the amount of platinum ranges from 0.1 wt. % to 10.0 wt. %, based on the total weight of the first support and the amount of rhodium ranges from 0.1 wt. % to 10.0 wt. %, based on the total weight of the second support.

7. The catalytic article according to claim 1, wherein the ceria content of the ceria-containing metal oxide component ranges from 5.0 wt. % to 50.0 wt. %, based on the total weight of the ceria-containing component.

8. The catalytic article according to claim 1, wherein the ceria content of the ceria-containing metal oxide component ranges from 5.0 wt. % to 30 wt. %, based on the total weight of the ceria-containing component.

9. The catalytic article according to claim 1, wherein the refractory alumina component comprises alumina, lanthana-alumina, ceria-alumina, titania-alumina, ceria-zirconia-alumina, zirconia-alumina, lanthana-zirconia-alumina, baria-alumina, baria-lanthana-alumina, baria-lanthana-neodymia-alumina, or any combination thereof.

10. The catalytic article according to claim 1, wherein the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof.

11. The catalytic article according to claim 1, wherein the oxygen storage component comprises ceria in an amount ranging from 5.0 wt. % to 100 wt. %, based on the total weight of the oxygen storage component.

12. The catalytic article according to claim 1, wherein the catalytic article is loaded with an amount ranging from 1.0 g/ft$^3$ to 300 g/ft$^3$ of platinum supported on the ceria containing metal oxide component and an amount ranging from 1.0 g/ft$^3$ to 100 g/ft$^3$ of rhodium supported on a support chosen from a refractory alumina component, an oxygen storage component or any combination thereof.

13. The catalytic article according to claim 1, wherein platinum is thermally or chemically fixed.

14. The catalytic article according to claim 1, wherein the amount of palladium is less than 0.001 wt. %, based on the total weight of the support in the catalytic article.

15. The catalytic article according to claim 1, wherein the substrate is chosen from a ceramic substrate, a metal substrate, a ceramic foam substrate, a polymer foam substrate, and a woven fibre substrate.

16. The catalytic article according to claim 1, wherein the catalytic article is essentially free of barium oxide.

17. A process for the preparation of a catalytic article according to claim 1, wherein process comprises preparing a slurry comprising platinum supported on a first support comprising a ceria containing metal oxide component and optionally a refractory alumina component, and rhodium supported on a second support chosen from a refractory alumina component, an oxygen storage component, and a combination thereof, depositing the slurry on a substrate to obtain a catalytic article followed by calcination at a temperature ranging from 400° C. to 700° C., wherein the step of preparing the slurry comprises a technique chosen from incipient wetness impregnation, incipient wetness co-impregnation, and post-addition.

18. A process for the preparation of a catalytic article according to claim 1, wherein the process comprises preparing a first layer slurry comprising platinum supported on a first support comprising a ceria containing metal oxide component and optionally a refractory alumina component, and a second layer slurry comprising rhodium supported on a second support chosen from a refractory alumina component, an oxygen storage component, and a combination thereof; depositing the first layer slurry on a substrate to obtain a first layer and depositing the second layer slurry on the first layer to obtain a second layer, followed by calcining at a temperature ranging from 400° C. to 700° C., wherein the step of preparing the slurry comprises a technique chosen from incipient wetness impregnation, incipient wetness co-impregnation, and post-addition.

19. An exhaust gas treatment system for internal combustion engines, the system comprising the catalytic article according to claim 1.

20. The exhaust gas treatment system according to claim 19, wherein the system comprises a platinum group metal based three-way conversion (TWC) catalytic article and the catalytic article, wherein the platinum group metal based three-way conversion (TWC) catalytic article is positioned downstream from an internal combustion engine and the catalytic article is positioned downstream in fluid communication with the platinum group metal based three-way conversion (TWC) catalytic article.

21. The exhaust gas treatment system according to claim 19, wherein the system comprises a platinum group metal based three-way conversion (TWC) catalytic article and the catalytic article, wherein the catalytic article is positioned downstream from an internal combustion engine and the platinum group metal based three-way conversion (TWC) catalytic article is positioned downstream in fluid communication with the three-way conversion (TWC) catalytic article.

22. A method of treating a gaseous exhaust stream comprising hydrocarbons, carbon monoxide, and nitrogen oxide, wherein the method comprises contacting the exhaust stream with the catalytic article according to claim 1.

23. A method of reducing hydrocarbons, carbon monoxide, and nitrogen oxide levels in a gaseous exhaust stream, the method comprising contacting the gaseous exhaust stream with the catalytic article according to claim 1 to reduce the levels of hydrocarbons, carbon monoxide, and nitrogen oxide in the exhaust gas.

* * * * *